June 15, 1965  W. E. FRADY, JR., ETAL  3,189,734
CONTROL SYSTEM WITH RATE PREDICTION
Filed Aug. 4, 1958   4 Sheets-Sheet 1
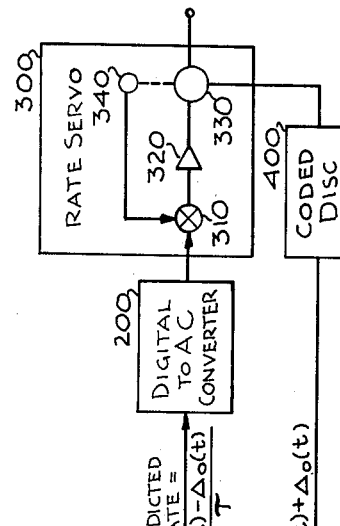
*Fig. 2a*
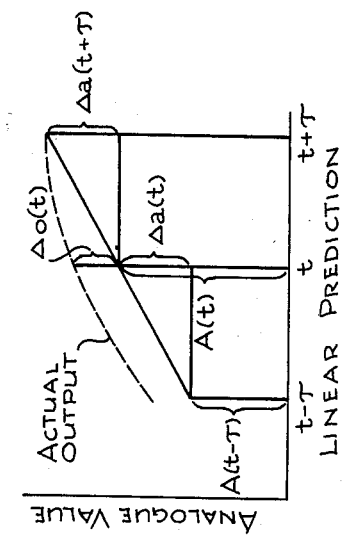
*Fig. 1*
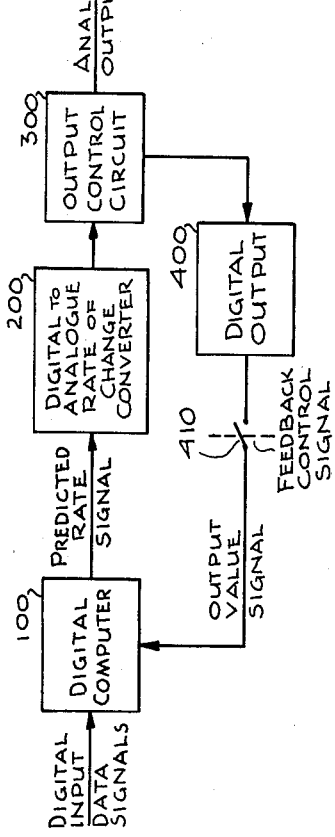
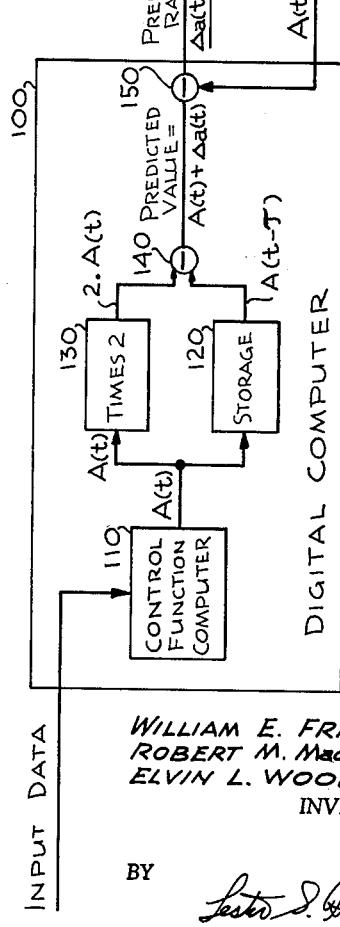
*Fig. 2*
WILLIAM E. FRADY, JR.
ROBERT M. MacINTYRE
ELVIN L. WOODS
INVENTORS
BY
ATTORNEY

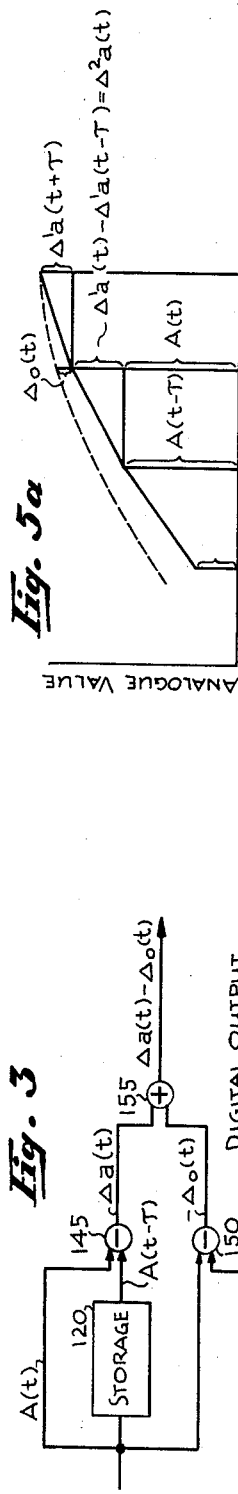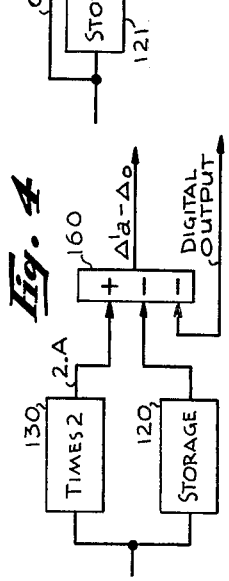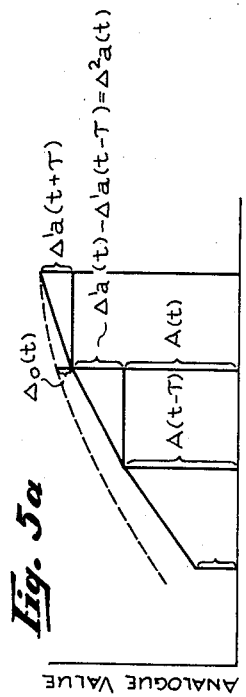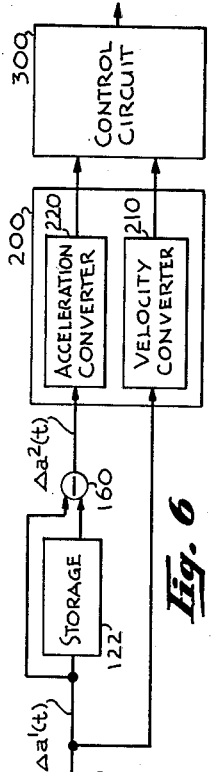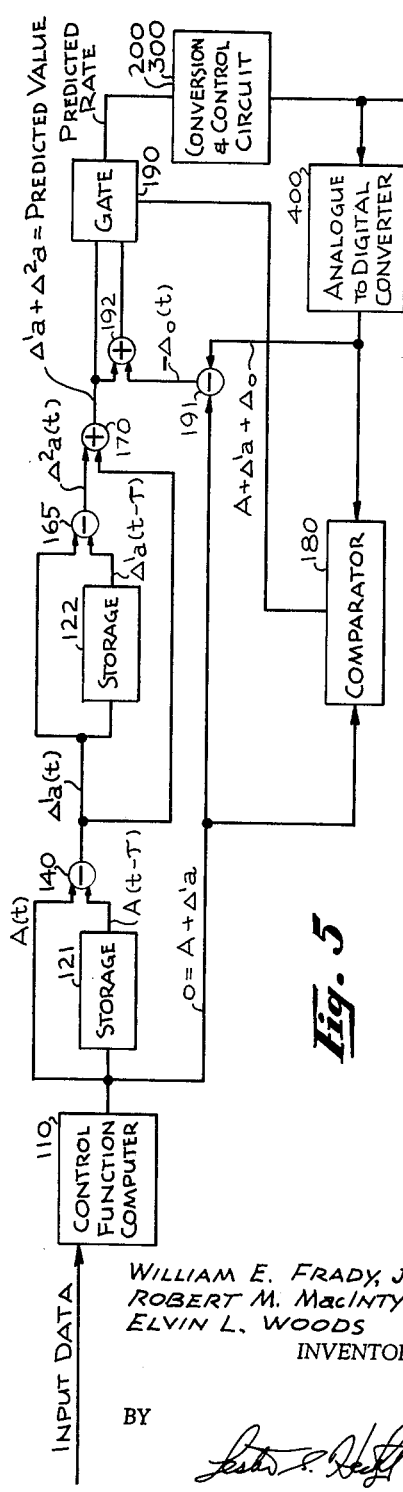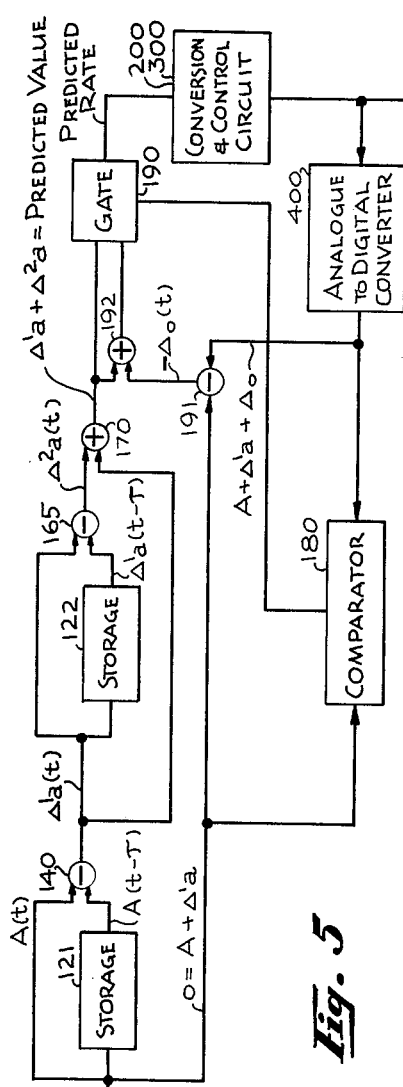

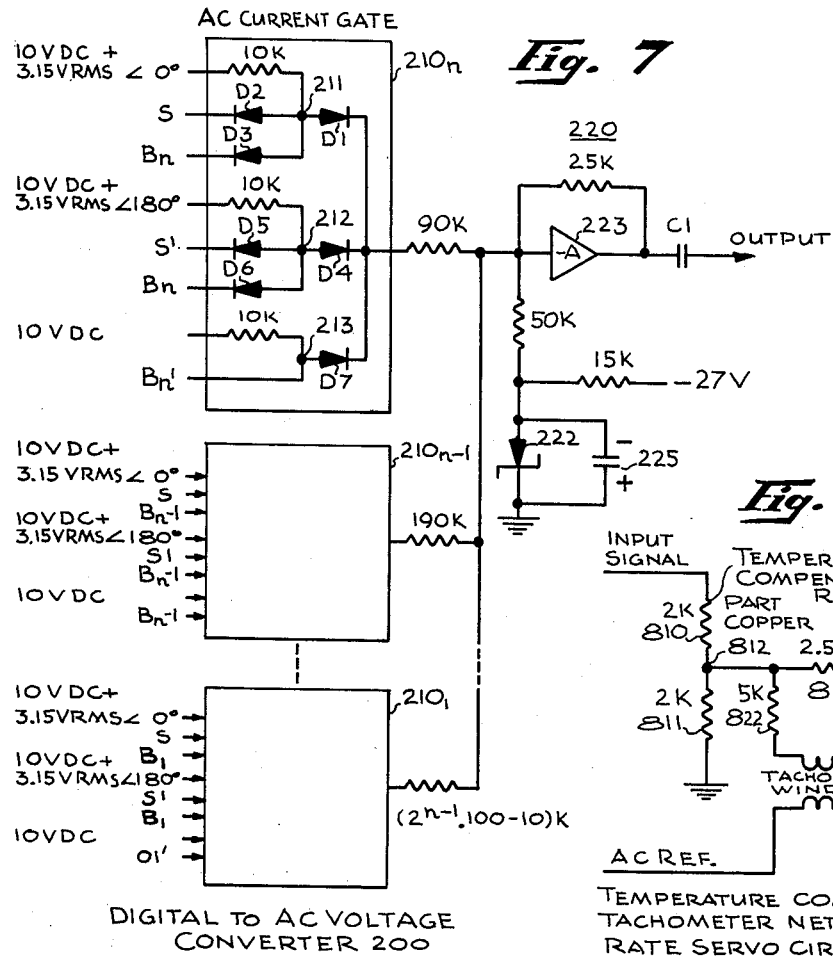
Fig. 7
Digital to AC Voltage Converter 200
Fig. 8
Temperature Compensated Tachometer Network in Rate Servo Circuit 300
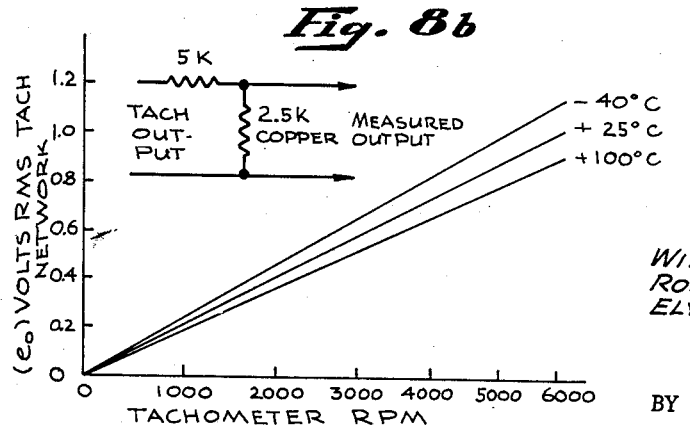
Fig. 8b
Tachometer Temperature Tests Using Temperature Compensation Network
WILLIAM E. FRADY, JR.
ROBERT M. MacINTYRE
ELVIN L. WOODS
INVENTORS
BY
ATTORNEY 3,189,734
CONTROL SYSTEM WITH RATE PREDICTION
William E. Frady, Jr., Palos Verdes Estates, Elvin L. Woods, Torrance, and Robert M. MacIntyre, Gardena, Calif., assignors, by mesne assignments, to Thompson Ramo Wooldridge Inc., Cleveland, Ohio, a corporation of Ohio
Filed Aug. 4, 1958, Ser. No. 752,751
20 Claims. (Cl. 235—154)

This invention relates to control systems and more particularly to a control system wherein the position of an element is controlled continuously at a rate which is predicted to correspond to digital input data.

The problem of controlling the position of an element, such as a shaft, in accordance with digital input data signals has been approached in many ways in the prior art. The variation in approach, however, is always inherent in the type of digital-to-analogue conversion performed, since all prior art systems presently known are common in operating discontinuously to provide an analogue control function which is essentially a series of step functions. A typical example of a prior art system is found in U.S. Patent No. 2,736,889 for "High Speed Electronic Digital-to-Analogue Converter System," by H. R. Kaiser et al. According to the technique of this patent an analogue output signal corresponding to digital input signals is developed by charging a storage capacitor until the level of its voltage equals the analogue equivalent of the digital input signals. The resulting capacitor signal is then employed to control a servo positioning device.

The Kaiser system is discontinuous in operation because the analogue position of the device which is controlled is not varied between the receipt of the digital input signals. This places a restriction upon the use of the control system since a digital input signal change may occur which cannot be converted and translated to an effective servo control signal within the operating time interval allowed. That is, the change in analogue position which is indicated to be necessary by the digital input data may be too large for the combined response time required for the conversion and servo action.

But the discontinuous type of operation inherent in the prior art systems is disadvantageous even where the conversion and servo speed of response are adequate in relation to the digital signal rate of change, in view of the step function nature of the output signal. Since the output signal is discontinuous the control function must be performed discontinuously or, at best, by some means of extrapolation. As a result the prior art systems have been definitely limited in speed of control response as well as accuracy.

The present invention avoids the discontinuous operation inherent in the prior art technique by providing a control system with rate prediction. According to the invention, means are provided for receiving digital input data during successive time intervals and for producing computed signals representing desired output conditions. These computed signals are analyzed and provision is made to produce a predicted rate signal which indicates the expected change in output signal value over the following interval. The predicted rate signal then is converted through appropriate means provided by the invention into a control signal which is employed to effect the desired analogue movement or signal change.

Accordingly it is an object of the present invention to provide a control system with rate prediction in order to obviate the disadvantages of the discontinuous operation of prior art systems.

Another object is to provide a control system wherein a digital computer is employed to increase the accuracy of analogue control.

A further object is to provide a control system wherein a rate servo receives continuous control signals as a function of digital input data.

Still another object of the invention is to provide a highly accurate control system which requires a relatively simple digital-to-analogue converter.

In addition to making accurate rate prediction possible the invention also makes it possible to minimize or eliminate errors in control which may be due to such factors as: time delays in computation; delays resulting from the acceleration time required for the operation of control elements such as a velocity servo; or delays in the receipt of input signals.

Accordingly, yet another object of the invention is to provide a control system wherein a digital computer is employed to compensate for computation or control delays which would otherwise result in control errors.

In providing a rate predicting control system the invention also contemplates certain specific improvements in structure. One of these improvements is a digital-to-A.C. converter which receives the digital input signals representing the predicted rate and converts these signals into an A.C. output signal having an amplitude representing the digital rate. This A.C. output signal may be employed directly to control a rate servo. Typically the A.C. output signal is applied to a difference circuit which also receives a feedback signal from a tachometer indicating the rate of change of a shaft, the position of which is to be controlled.

Another specific improvement provided by the invention as part of the overall predicted rate control technique is a circuit for compensating for the error which normally results in measuring the rate of change of a shaft by means of a tachometer. The invention contemplates the use of a novel temperature compensating circuit which changes the effective voltage output of the tachometer in a direction which is opposite to the normal voltage change of a tachometer with temperature. That is, the temperature compensation circuit of the invention increases the effective voltage of the tachometer for decreasing temperature in order to maintain the output voltage thereof relatively constant.

Accordingly, a specific object of the invention is to provide an improved converter circuit which is adapted for use in a rate control system for producing an A.C. control signal directly in response to digital input signals.

Another specific object of the invention is to provide a temperature compensation circuit to permit the derivation of a substantially constant tachometer signal for widely varying conditions of temperature.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

FIG. 1 is a block diagram of one form of the invention;

FIG. 2 illustrates a suitable prediction function for the computer of FIG. 1 as well as the use of a rate servo;

FIG. 2a is a graph illustrating the operation of linear prediction according to the invention;

FIGS. 3 and 4 illustrate other variations in structure employing a linear prediction function according to the invention;

FIG. 5 illustrates an embodiment of the invention using the summation of first and second differences as a prediction function;

FIG. 5a is a graph illustrating the operation of the invention in using first and second differences for prediction;

FIG. 6 illustrates a variation in second difference prediction operation wherein the first and second differences are employed separately to control velocity and acceleration separately.

FIG. 7 is a schematic diagram of a preferred form of digital-to-A.C. converter circuit according to the present invention;

FIG. 8 is a schematic diagram of a preferred form of temperature compensation circuit which may be employed with a tachometer according to the invention;

FIG. 8b is a graph indicating tachometer r.p.m. plotted against volts R.M.S. with associated resistor network.

Figure 8A:
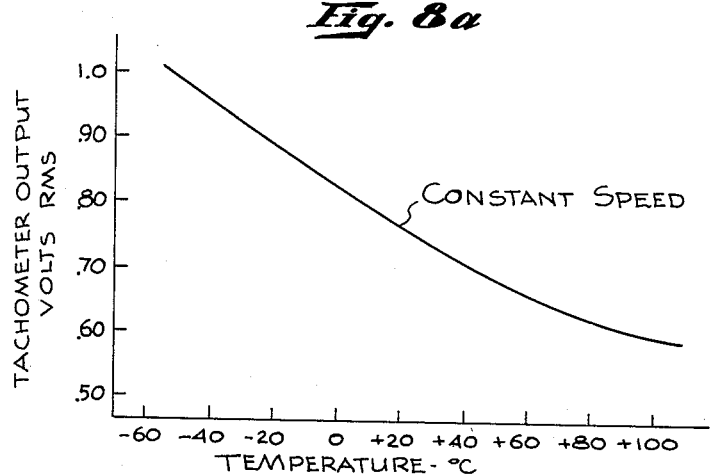
FIG. 8a is a graph indicating the effect of one of the temperature compensation networks shown in FIG. 8.

Reference is now made to FIG. 1 wherein the general form of the invention is illustrated in block diagram form. As indicated in FIG. 1, digital input data signals are applied to a digital computer 100 which produces an output signal representing a predicted rate. This predicted rate is proportional to the expected change in analogue amplitude which will be represented by the digital input data signals during the next computing interval. The predicted rate signal may be produced as a function of a signal representing an analogue output value. In this case the predicted rate is modified to compensate for any error in the analogue output value which typically represent the position of a shaft.

The predicted rate signal produced by computer 100, or a signal which is modified to compensate for the present error position, is then applied to a digital-to-analogue rate-of-change converter 200. Converter 200 produces an analogue output signal corresponding to the digital value of the input signals. The output signal of converter 200 is then applied to an output control circuit 300 which, in a typical case, may be a rate servo as illustrated in FIG. 2.

In the case where the predicted rate signal produced by computer 100 is to be corrected in accordance with the actual output value, the analogue signal produced by control circuit 300 is converted back in to a digital representation and then applied through feedback control switch 410 to computer 100. Computer 100 then produces a modified rate prediction signal which takes the present error in position into acocunt.

The invention can best be understood by considering a few specific illustrations. For this purpose, the use of linear prediction will be described first with reference to FIG. 2a.

In FIG. 2a the symbol $A(t-\tau)$ represents the analogue output value which is computed by computer 100 as a function of the digital data input signal with the result appearing at time $t-\tau$. This analogue value is shown as an ordinate value in FIG. 2a. In a similar manner the symbol $A(t)$ represents a presently desired output value at time "$t$" as a function of the digital input data signals available during the interval between "$(t-\tau)$" and the present time "$t$."

It will be noted that during the time interval between $(t-\tau)$ and $t$, the previously desired analogue value increases by an amount represented as $\Delta a(t)$.

Since the variation in the analogue output signal is assumed to be linear, it will be noted that the analogue values at times $t-\tau$ and $t$ are joined by a straight line and then vary along the same linear slope to the time $t+\tau$ so that $\Delta a(t+\tau)$ is equal in magnitude to $\Delta a(t)$. During the interval between the time $(t-\tau)$ and $t+\tau$, the actual analogue output signal may not be equal to the desired analogue variation. The actual signal is represented by a dotted line and may be noted to differ in magnitude from the analogue value $A(t)$ at time $t$ by the amount $\Delta o(t)$.

Many variations in linear prediction structure are possible according to the present invention. One of these will now be considered with particular reference to FIG. 2. In FIG. 2 input data for a linear prediction function such as $A(t)=a.t+b$ is applied to a control function computer 110. Computer 110 may be a conventional general purpose digital computer such as is described on pages 340 through 375 of a book entitled, "Logical Design of Digital Computers," by Montgomery Phister Jr., published by John Wiley and Sons, Inc., in 1958, or may be a special purpose digital computer designed for a specific control purpose as is described on pages 375 through 386 of the book. Other suitable computer systems are described in the references in bibliography of this book starting on page 386. In the case of simple linear prediction, the computer receives data indicating the constants "$a$" and "$b$" and continuous time information, and then produces an output signal $A(t)$ which indicates the desired analogue value. A similar computation had been performed during a previous interval and this value was stored in a suitable storage device 120 which presently produces an output signal represented as signal $A(t-\tau)$. Storage device 120 may comprise a series of flip-flops or memory elements such as described on pages 25 to 27 of the Phister book mentioned above, where the elements are connected as a shifting register (see pages 246, 247 thereof) so that the appropriate numbers may be shifted from computer 110 for storage as they are produced. Signal $A(t)$ is applied to a times two circuit 130 which typically may consist of a shifting register with an additional storage element or flip-flop so as to introduce an effective left shift of one. In other cases this may be performed by a multiplier such as is described on pages 305 through 316 of the Phister book. This then provides the output signal $2.A(t)$. Signals $A(t-\tau)$ and $2.A(t)$ are then combined in a substracter 140, described on page 360 of the book, which produces a predicted value signal Pv defined as follows:

$$Pv=2A(t)-A(t-\tau)$$
$$=2[A(t-\tau)+\Delta a(t)]-A(t-\tau)$$
$$=[A(t-\tau)+\Delta a(t)]+\Delta a(t)$$
$$=A(t)+\Delta a(t)$$

The predicted value, it will be noted, is computed to be the present value plus the change during the previous time interval. In other words the change $\Delta a(t)$ is assumed to be constant so that the next change in amplitude $\Delta a(t+\tau)$ is assumed to be equal to $\Delta a(t)$.

In the embodiment of FIG. 2, provision is made to feed back the actual analogue position as represented in digital form. This is done by reading an analogue signal from output control circuit 300, assumed as an illustrative case to be a shaft position, and translating it through a coded disc 400 into the appropriate digital representation. A suitable disc arrangement for shaft conversion is described on pages 230 and 231 of the Phister book. That is, the shaft controlled by rate servo 300 has a disc attached thereto so that the analogue position thereof is continuously represented as a digital code. This digital feedback code represents an analogue value $A(t)+\Delta o(t)$, which is the presently desired analogue signal $A(t)$ plus the difference $\Delta o(t)$ between this signal and the actual output level or position.

A predicted rate signal $Pr$ may be produced with compensation for the actual output value as follows:

$$P_r = \frac{Pv - [A(t) + \Delta o(t)]}{\tau}$$

$$= \frac{A(t) + \Delta a(t) - \Delta o(t)}{\tau}$$

$$= \frac{\Delta a(t) - \Delta o(t)}{\tau}$$

The above linear rate prediction function with modification for position error specifies that the rate of change in the output value should be equal to the difference between the previous change in the desired output value and the error in value, divided by the time interval $\tau$. The time interval $\tau$ is selected to be unity so that no actual division need be performed. If there is no difference between the present actual output signal and that which is desired, the position error $\Delta o(t)$ is zero and the predicted rate is then equal to $\Delta a(t)$.

FIG. 2 also illustrates one general arrangement for converter 200 and output control circuit 300. It will be noted that circuit 200 is a digital to A.C. converter, which may be of the form illustrated in further detail in FIG. 7 discussed below. This circuit is designed to provide an A.C. signal for driving a rate servo, such as is illustrated in block 300, constituting the output control circuit. Converter 200 operates in response to digital input signals to provide an A.C. output signal having an A.C. amplitude representing the digital prediction rate of change. This A.C. signal then is applied to a difference circuit 310 which produces a signal applied to a servo amplifier 320 and thence to a motor 330 which drives an output shaft to be positioned. Motor 330 is mechanically coupled to a tachometer 340 which produces an A.C. signal representing the rotational velocity of the shaft. The tachometer signal, then, is sent back to difference circuit 310 so that when the rate of movement of motor 330 is equal to the predicted rate of movement, the difference signal derived through circuit 310 will be substantially zero and the shaft rate of rotation will be the desired predicted rate or the predicted rate with modification for position error. The component devices of circuit 300 may be conventional such as are described in the book, "Analogue Computers," by Korn and Korn, published by the McGraw-Hill Co.

An appropriate temperature compensation circuit for tachometer 340 will also be considered in detail below the reference to FIGS. 8 and 8a. This circuit is arranged to prevent temperature changes from adversely affecting the operation of the rate servo.

Reference is now made to FIGS. 3 and 4 as illustrations of other variations in structure for accomplishing the linear prediction technique of the invention. As indicated in FIG. 3, signal $A(t-\tau)$ produced by storage device 120 in computer 100 may be subtracted directly from the present predicted signal $A(t)$ through a subtractor 145. This produces the difference signal $\Delta a(t)$. In a similar manner, a direct subtraction may be performed between the digital equivalent of the output value $$A(t) + \Delta o(t)$$

and the presently desired digital representation of the analogue value $A(t)$ through a subtractor 150 to produce a signal corresponding to $-\Delta o(t)$. Signals $\Delta a(t)$ and $-\Delta o(t)$ then are added in circuit 155 which may be of the type described on pages 253 through 278 of the Phister book. Circuit 155 produces a predicted change signal $Pc$:

$$Pc = \Delta a(t) - \Delta o(t)$$

This is then scaled over the time interval $\tau$ to develop signal $Pr$:

$$P_r = \frac{\Delta a(t) - \Delta o(t)}{\tau}$$

The scaling by $\tau$ may again be made by utilizing a $\tau$ of unity to obviate the necessity of actual division.

In FIG. 4 the circuit is aranged to accomplish the same prediction as the embodiment of FIGS. 2 and 3 with the exception that a combining circuit 160 is provided for adding and performing a double subtraction in a single operation. That is, circuit 160 is used in lieu of circuits 145, 150 and 155 shown in FIG. 3. Circuit 160 may be an adder-subtractor of the type described on pages 276 and 278 of the Phister book.

Another arrangement of the invention is shown in FIG. 5 which has several novel features. Firstly, it will be noted that first and second storage devices 121 and 122 are employed in the place of the single storage device 120 shown in FIG. 2. These storage devices may all be of the type mentioned above. This makes it possible to obtain a second difference signal represented as $\Delta^2 a(t)$ which is equal to the difference between the present first difference $\Delta^1 a(t)$ and the previous first differences $\Delta^1 a(t-\tau)$. That is:

$$\Delta^2 a(t) = \Delta^1 a(t) - \Delta^1 a(t-\tau)$$

Thus, in the instance of the embodiment of FIG. 5, output signal $A(t)$ presently produced by control function computer 110 is combined in a subtractor 140 with the previous desired signal $A(t-\tau)$ to produce a first difference signal $\Delta^1 a(t)$ as in the embodiment of FIG. 3. Then a similar operation is performed to subtract the first difference $\Delta^1 a(t)$ from the previous difference retained in storage device 122 and represented as signal $\Delta^1 a(t-\tau)$. This subtraction is performed in a second subtractor 165 to produce signal $\Delta^2 a(t)$. The first and second differences, then, may be combined in an adder circuit 170 and utilized directly as an approximation to a second difference prediction, or may be combined in a manner now to be described with the actual output value represented in digital form.

In the embodiment of FIG. 5 a rate control signal is produced which is either equal to the difference between a predicted rate and the present error in position over time or is equal directly to the predicted rate without any compensation for the actual output position. Provision is made in the embodiment of FIG. 5 so that after an initial operating period, during which time the system approaches the desired analogue output value, subsequent control may be made independent of the measured output value if this value is found by comparison with the predicted value to be greatly in error. This technique makes it possible to accomplish a smoother control which would not be affected by a code conversion error, as a typical example.

The comparison may be performed through a conventional comparator circuit 180, which may be of the type described on pages 310 through 321 and 377 through 379 of the Phister book, and which receives the digital equivalent of the analogue output signal produced by an analogue-to-digital converter circuit 400. The comparator, then, controls a gating circuit 190 which passes either the predicted rate signal without compensation, that is, a signal equal to $\Delta^1 a(t) + \Delta^2 a(t)$; or, where the actual analogue output value is within certain predetermined reasonable limits, the predicted rate signal is modified by adding the signal $$\frac{-\Delta o(t)}{\tau}$$

through digital adder 192, which may be of the same type mentioned above, to produce the modified rate signal:

$$P_r = \frac{[\Delta^1 a(t) + \Delta^2 a(t) - \Delta o(t)]}{\tau}$$

In the circuit shown in FIG. 5 it will be noted that signal $\Delta o(t)$ is first formed in a subtractor 191 by subtracting the actual output value, represented digitally by circuit 400, from the desired present value signal $A(t)$. This provides the difference signal $-\Delta o(t)$ which is then added to the predicted rate signal $$\frac{[\Delta^1 a(t) + \Delta^2 a(t)]}{\tau}$$

through an adder circuit 192.

The purpose of the selective operation through the use of gating circuit 190 is to avoid erroneous control in the system, after the initial operating period, where the digital conversion of the analogue output signal is greatly in error. This error may be overlooked, however, where the rate of control is relatively slow and may therefore be corrected during successive intervals, or where the computing time intervals are relatively short, permitting rapid correction of errors. The comparator-controlled gating operation is preferred, however, whenever relatively long computing intervals are permitted during which time an erroneous output signal could cause a substantial deviation from the desired value or position, or where the control response is relatively rapid.

The operation of the circuit of FIG. 5 is illustrated graphically in FIG. 5a. Four ordinate values are indicated at times:

$$(t - 2\tau); \ (t - \tau); \ t; \ \text{and} \ (t + \tau)$$

It will be noted that the rate of change is assumed to remain constant during each interval. This conforms to the structure of FIG. 5 where the first and second difference signals are added to form the signal $\Delta^1 a(t) + \Delta^2 a(t)$. As in FIG. 2a, the difference in value between the present desired value $A(t)$ and the actual output value is represented as $\Delta o(t)$.

A continuously varying rate of change may be accomplished by utilizing the first and second difference signals independently. This $a^1(t)$ is applied to a velocity converter 210, which may be a digital-to-analogue converter of the type described on pages 147, 230, or 238 of the Phister book; and signal $a^2(t)$ is applied to acceleration converter 220, which may be of the same type. One manner of accomplishing this is to utilize a separate amplifier with a gain which can be varied at a rate proportional to an applied acceleration control signal. The amplifier can then be utilized to amplify an applied velocity control signal to produce a signal which changes its amplitude at the acceleration signal rate. In the case of FIG. 5a the acceleration rate is negative. That is, the velocity or servo rate is decreasing.

From the foregoing description it should now be apparent that the present invention provides a control system with rate prediction which avoids the disadvantages of the discontinuous operation of prior art systems. Since a digital computer is utilized to continuously adjust for errors in the analogue control mechanisms employed, it should be apparent that the analogue mechanisms need not operate at a high degree of accuracy and/or reliability since the digital computer can continuously correct for errors.

Furthermore, it has been shown that provision can be made for operating the system independently of the analogue output signal where it is found to be excessively in error.

As a result the invention makes it possible to construct a highly accurate control system without the usual expense of a highly accurate digital-to-analogue converter. And the control which is possible is relatively smooth throughout each interval of operation due to the predicted rate of change feature.

While converter 300 may assume any of a multitude of different forms, it is preferred to employ a digital-to-A.C. converter of the type shown in FIG. 7 where a rate servo such as that shown in FIG. 2 is to be controlled. The advantage of the digital-to-A.C. converter is that it provides a direct conversion from the digital input signal to the desired A.C. control signal and may therefore be combined in difference circuit 310 shown in FIG. 2 to generate an error signal for driving the shaft 330.

As indicated in FIG. 7 converter 200 may be comprised of a series of A.C. current gates 210. As an illustration of the mechanization of these gates, gate $210_n$, the $n$th gate is shown in detail and two other gates, namely, $210_{n-1}$ and $210_1$ are shown to indicate that any number may be employed. Each gate receives three types of input signals. The first is a carrier signal modulated with an A.C. signal of predetermined amplitude such as a 10 volt D.C. carrier with a 3.15 R.M.S. A.C. modulation thereon. This first signal has its A.C. component in either of two phases; one which represents a positive digital input number and the other representing a negative digital input number. In the particular illustration shown in FIG. 7, it will be noted that a positive number is represented by a zero degree A.C. component and a negative number is represented by a phase shifted A.C. signal at 180°.

The second input signal is a sign control signal designated in FIG. 7 as signal S, its complement being shown as signal S'. The third input signal is a binary digit, each current gate receiving a different digit corresponding to a digital weight. Thus, digit $Bn$ of an input number is applied to current gate $210_n$ and is the highest place binary digit of the input number, whereas $B_1$ is the lowest place binary digit of the input number and is applied to gate $210_1$.

The carrier modulated with an A.C. signal is applied through an appropriate input impedance shown as 10K ohms in FIG. 7 to a junction point 211 which also receives sign control signal S applied through a diode D2 and binary digit $Bn$ applied through a diode D3. Effectively this first network constitutes an "and" circuit which produces an output signal only when all of the input conditions are satisfied. That is, an output signal passes through diode D1 only when the input number is positive and a binary digit having the desired value is present at the input. It will be assumed for present purposes that the binary digit value of 1 is effective to control the formation of an output signal, though it will be understood that the current gate will operate equally effectively where a zero binary digit causes the passage of an output signal.

In a similar manner the carrier signal modulated with an A.C. component 180° shifted is applied through a 10K ohm resistor to a junction point 212 which receives complementary sign control signal S' through diode D5 and binary digit $Bn$ to diode D6. When the input conditions are satisfied, that is, when the digital number is negative and the desired value of binary digit is present, an output signal passes through diode D4. Finally in a third network in current gate $210_n$ the carrier of 10 volts D.C. is applied through a 10K ohm input resistor to a junction point 213 which also receives a complementary binary input digit $B_n'$. This provides an input signal passed through diode D7 when the complementary state of input digit is present.

Current gate $210_n$ is effective then to provide an output signal having an A.C. component of either of two phases depending upon the sign of the number or an output signal without any A.C. component but with the same carrier when the complementary stage of the binary signal occurs. This means that, looking at the total series of current gates, the same carrier level is gated through under all input conditions since regardless of the sign or condition of the binary input digits, the 10 volt D.C. signal is passed through. The output signal, however, varies in phase according to the sign control signal which is effective.

The output signals are combined through a current summing network shown as including resistors of values 90K ohm, 190K ohm . . . $(2^{n-1}.100-10)$K ohms. These resistors are selected so that the current which passes from gate 210 is given a weight to correspond to the most significant binary digit of the input number, whereas the current which passes through the least significant stage is given a weight to correspond to the smallest binary digit of the input number. If there were five input digits, for example, the summing resistor of the least significant stage would have a value $2^4 \cdot 100 = 10K$ ohms or 1590K ohms.

The output signal provided by the current summing network is applied to an amplifier circuit 220. This is a conventional feedback amplifier system, with appropriate values being given to indicate a suitable arrangement. A Zener diode 222 is shown for regulating the voltage applied to the input circuit in amplifier 223 having an appropriate bypass capacitor 225 in shunt therewith. The signal derived through amplifier 223 is passed through a coupling capacitor C1 to provide an output signal which has an amplitude corresponding to the digital value of the input number, but no carrier signal.

It can be seen then that the converter shown in FIG. 7 is adapted for providing a direct conversion from a digital input number to an A.C. control signal. Another advantage of the digital-to-A.C. converter is that automatic compensation for variations in the tachometer A.C. excitation voltage (labeled A.C. reference in FIG. 8) is achieved when the A.C. voltage for input to the A.C. current gates is also derived from the same source. If the A.C. reference voltage increases, the tachometer output increases and the A.C. input to the current gates increases. The difference signal, therefore, remains constant and the operation of the system is not influenced by variations in the A.C. reference voltage. In practice, the A.C. reference is derived from the unregulated power line.

This compensation is very difficult to achieve using conventional digital-to-D.C. conversion and a chopper to obtain square wave output since then the amplitude does not depend on line voltage.

Another circuit feature preferred for the practice of the invention is shown in FIG. 8. This circuit may be either considered to be part of difference circuit 310 or of amplifier 320. That is, the circuit in FIG. 8 effectively combines the output portion of difference circuit 310 and the input portion of amplifier 320 with the tachometer feedback voltage being introduced.

As indicated in FIG. 8 an input signal derived from converter 200 is applied to a first temperature compensating resistor 810 which may appropriately be made, in part, of copper. This resistor has its other end connected to a second ordinary resistor which is indicated to have the same impedance of 2K ohms at an appropriate temperature median value. The voltage derived from the junction point 812 between the two input resistors is applied to a second temperature compensating network 820, including a first copper resistor of typically 2.5K ohms coupled in series between junction point 812 and the output point of the circuit. The second resistor 822 is an ordinary resistor which may typically be 5K ohms. Resistors 820 and 822 are coupled across the tachometer output winding and are selected to compensate for the tachometer temperature variation as will now be described with reference to FIG. 8a.

As indicated in FIG. 8a, a typical tachometer output varies considerably for temperature variations between −60° C. and +100° C. Thus, in the example shown in FIG. 8a, a tachometer moving at 3000 r.p.m. may produce one volt R.M.S. output at approximately −50° C., whereas at the same r.p.m. at +100° C. the output voltage may be as low as .6 volt R.M.S.

The effect of the network, including resistors 821 and 822, is to increase the effective output voltage introduced by the tachometer as temperature increases. Thus, as the voltage across the output winding of the tachometer drops with an increase in temperature its effect is increased through the network of resistors 821 and 822 so as to maintain the resulting voltage approximately constant.

Some variation however still exists as indicated in FIG. 8b where a tachometer r.p.m. varying from 0 to 6000 r.p.m. is indicated plotted against volts R.M.S. This variation may be compensated for by the proper selection of the copper content of resistor 810. Resistor 810 has the effect of decreasing the portion of the input signal which appears at junction point 812 as temperature increases. In terms of the rate servo feedback loop then, a substantially constant shaft r.p.m. may be accomplished for wide variations in temperature, firstly because the tachometer voltage variation is partially compensated for, as indicated in FIG. 8b, by the network of resistors 821 and 822 due to the increasing impedance across resistor 821 with temperature; and a very close control is then permitted with a proper selection of resistor 810 which maintains the difference signal applied to amplifier 420 at substantially zero, when the output shaft is revolving at the desired rate.

Figure 9:
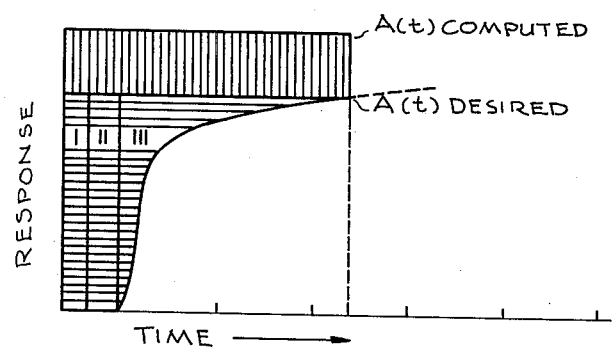
FIG. 9 is a diagram illustrating the manner in which the invention may compensate for time delays in response, computation, or application of input signals.

Reference is now made to FIG. 9 where the control response of a typical system is indicated. Firstly, it will be noted that a time lag I occurs during a period of computation, then a lag II occurs applying computed signals for use, and finally there is a lag III in the dynamic response of the servo. These delays may be compensated for by computing the desired predicted value $A(t)$ to be greater than the true value according to the input data by an amount $\Delta c$ which provides a Correction Area, so designated in FIG. 9, equal to the total delay area. That is, the delay area designated with horizontal shading in FIG. 9 is compensated for by the larger control signal area designated with vertical shading in FIG. 9.

It should be apparent, therefore, that the technique of the invention whereby a digital computer is employed cooperatively with digital-to-analogue converter control means not only simplifies the complexity of the converter portion of the system, but also makes it possible to correct for many errors which would otherwise occur due to the inherent delays in various components.

We claim:

1. A digital control system for effecting analogue variations in value as a predetermined function of digital input data, said system comprising: first means for receiving signals corresponding to said input data and computing previous and present desired analogue values representable as signal $A(t-\tau)$ and $A(t)$, respectively; second means responsive to signals $A(t-\tau)$ and $A(t)$, for producing a signal $P_r$ representing the predicted rate of change in analogue value for the interval $t$ to $t+\tau$; and third means responsive to signal $P_r$ for changing the present analogue value representable as $A(t)+\Delta o(t)$, where $\Delta o(t)$ represents the deviation between the present desired analogue value $A(t)$ and the actual analogue value, to approach or equal the desired next analogue value representable as $A(t+\tau)$.

2. The digital control system defined in claim 1 wherein said second means includes a first circuit for producing a signal $2A(t)$; a second circuit for subtracting said signal $A(t-\tau)$ from signal $2A(t)$; and a third circuit for subtracting a signal representing the analogue value $A(t)+\Delta o(t)$ to produce a prediction signal $P_r$ approximated as the function:

$$P_r = \frac{\Delta a(t) - \Delta o(t)}{\tau}$$

where $\Delta a(t)$ is the change in amplitude from analogue value $A(t-\tau)$ to value $A(t)$ and $\tau$ represents a unit time interval.

3. The digital control system defined in claim 1 wherein said second means includes a first circuit for subtraction signal $A(t-\tau)$ from signal $A(t)$ to form a signal $\Delta a(t)$; includes a second circuit for subtracting signal $$A(t)+\Delta o(t)$$

from signal $A(t)$ to produce signal $-\Delta o(t)$; and includes a third circuit for adding signals $\Delta a(t)$ and $-\Delta o(t)$ to produce a prediction signal:

$$P_r = \frac{\Delta a(t) - \Delta o(t)}{\tau}$$

where $\tau$ is a unit time interval.

4. The digital control system defined in claim 1 wherein said second means includes a first circuit for producing a signal $2A(t) = 2[A(t-\tau) + \Delta a(t)]$; and a second circuit for combining signal $A(t) + \Delta o(t)$ with signals $2A(t)$ and $A(t-\tau)$, to produce a prediction signal $P_r$ defined as:

$$P_r = \frac{\Delta a(t) - \Delta o(t)}{\tau}$$

where $\Delta a(t)$ is the change in amplitude from analogue value $A(t-\tau)$ to value $A(t)$ and $\tau$ represents a unit time interval.

5. The digital control system defined in claim 1 wherein said second means includes a first circuit for forming the signal $\Delta^1 a(t-\tau) = A(t) - A(t-\tau)$; and a second circuit for forming the signal $\Delta^2 a(t-\tau) = \Delta^1 a(t) - \Delta^1 a(t-\tau)$.

6. The digital control system defined in claim 5 wherein said second means further includes means for producing said prediction signal $P_r$ as the function:

$$P_r = \frac{\Delta^1 a(t-\tau) + \Delta^2 a(t-\tau)}{\tau}$$

where $\tau$ is a unit time interval.

7. The digital control system defined in claim 5 wherein said third means includes first and second circuits responsive to signals $\Delta^1 a(t-\tau)$ and $\Delta^2 a(t-\tau)$, respectively, for producing output signals representing the desired velocity and acceleration components of said analogue variations, respectively.

8. The digital control system defined in claim 1 wherein additional means are provided for comparing signals $A(t)$ and a signal $A(t) + \Delta o(t)$ and for producing a signal $P_r$ as a function of said deviation signal $\Delta o(t)$ when it is with certain predetermined limits from said signal $A(t)$, and as a function only of said digital input data when said deviation $\Delta o(t)$ exceeds said predetermined limits.

9. An arrangement for controlling the position of a shaft in accordance with a predetermined function of digital input variables, said arrangement comprising: a control function computer for producing successive digital signal sets representing the desired shaft position at the end of a corresponding time interval; means for storing each digital signal set to produce a delayed signal set representing a previously desired shaft position; and means responsive to said digital signal sets and to said delayed signal sets for producing, during each time interval, a predicted rate of shaft position signal for controlling the rate of rotation of said shaft until the next digital signal set is produced.

10. A predicted rate servo control system for controlling the position of an element, said system including a digital computer for receiving input data and producing first digital signals representing successive desired analogue values; means for multiplying said first digital signals by two to produce second digital signals; means for delaying said first digital signals for one time interval to produce third digital signals; means for representing the position of said element as fourth digital signals; and means responsive to said second, third, and fourth digital signals for producing a servo rate signal for moving said element at a rate which is predicted to make its position correspond to the previous first digital signals, at the end of the corresponding time interval.

11. A shaft position control system for moving a shaft at a rate predicted to correspond to the desired movement specified by digital input data, said system comprising: first means responsive to the input data for producing signals representing the desired angular position for said shaft at the end of the following time interval; second means for predicting the value which will be specified by said input data for the shaft at the end of the next time interval; third means for producing digital output signals representing the actual position of said shaft; and fourth means coupled to said second and third means for producing a rate control signal for moving said shaft at said predicted rate.

12. A digital system for controlling analogue variations as a predetermined function of digital input data, said system comprising: first means for receiving signals corresponding to said input data and for computing previous and present desired analogue value signals; second means responsive to said value signals for producing a predicted rate signal indicating the expected rate of change in the desired analogue value during the next interval; third means for producing an output signal representing the actual analogue value; and fourth means responsive to said predicted rate signal and to said output signal for producing a modified predicted rate signal which is adjusted from said predicted rate signal in accordance with the degree of error in the actual analogue value as compared with the then desired analogue value.

13. The digital system defined in claim 12 wherein there is further included means for comparing the output signal with the present desired analogue value signal and means for preventing said fourth means from producing said modified predicted rate signal when said output signal is not within predetermined limits of said desired analogue value signal.

14. In a system for controlling the position of an element wherein a digital computer produces a digital signal set representing the rate of change in position desired for said element, the element being controlled through a rate servo; a converter comprising: a plurality of A.C. current gates for receiving the binary digits of said digital signal set, respectively, and a sign signal, each of said current gates including a first circuit for producing an A.C. signal superimposed on a carrier, the A.C. signal having a first phase in response to a plus sign signal and a one binary digit, a second circuit for producing an A.C. signal superimposed on a carrier, the A.C. signal having a second phase in response to a minus sign signal and a one binary digit in the respective place, and a third circuit for producing the carrier in response to a zero binary digit in the respective place; a current summing network for combining the currents delivered by said current gates in amounts corresponding to the binary digits received, respectively; and output means for translating the combined carrier and A.C. signals passed through said current gates into an A.C. output signal having an amplitude corresponding to the value represented by said digital signal set.

15. The converter defined in claim 14 wherein said carrier is a D.C. signal.

16. The converter defined in claim 14 wherein said first phase is referenced at zero degrees and said second phase is 180°.

17. In a system for controlling the position of an element at a rate specified in accordance with a series of digit control signals, each digit control signal having a different binary weight, a decoding circuit for translating said digit control signals into an A.C. output signal having an envelope amplitude corresponding to the digital value of said control signal series, said decoding circuit comprising: a plurality of first networks for receiving a first input signal in the form of a carrier modulated with an A.C. input signal of first phase, a signal control signal, and said digit control signals, respectively, for producing an output signal corresponding to said first input signal when said sign control signal represents a positive number and said respective digit control signal has a first binary value; a plurality of second networks for receiving a second input signal in the form of said carrier modulated with an A.C. input signal of a second phase, said sign control signal, and said digit control signals, respectively, for producing output signals corresponding to said second input signal when said sign control signal represents a negative number and said respective digit control signal has said first binary value; a plurality of third networks for receiving said carrier as an input signal and said digit control signals, respectively, for producing output signals corresponding to said carrier when said respective digit control signal represents its second binary value; and a summing network for combining said output signals in accordance with the respective binary weights represented to produce said A.C. output signal.

18. The decoding circuit defined in claim 17 wherein said first binary value is binary one and said second binary value is binary zero.

19. The decoding circuit defined in claim 17 wherein said first binary value is binary zero and said second binary value is binary one.

20. The decoding circuit defined in claim 17 wherein said carrier is a D.C. signal and wherein means is included coupled to said summing network for separating out said D.C. signal to produce said A.C. output signal.

References Cited by the Examiner
UNITED STATES PATENTS

| | | | |
|---|---|---|---|
| 2,814,006 | 11/57 | Wilde | 235—154 XR |
| 2,830,257 | 4/58 | Denz | 323—68 |
| 2,865,564 | 12/58 | Kaiser et al. | 235—154 |
| 2,874,343 | 2/59 | Steele | 235—154 XR |
| 2,875,432 | 2/59 | Markow | 340—347 |
| 2,886,753 | 5/59 | Abbott | 235—154 XR |
| 2,928,604 | 3/60 | Dudman et al. | 235—197 |
| 2,944,209 | 7/60 | Klug | 323—68 |
| 2,954,165 | 9/60 | Myers | 235—154 |
| 2,970,308 | 1/61 | Springfellow et al. | 340—347 |

MALCOLM A. MORRISON, *Primary Examiner.*

LEO SMILOW, C. D. ANGEL, WALTER W. BURNS, JR., *Examiners.*